2,908,549

PREPARATION OF SELECTIVE SORBENTS

John H. Estes, Wappingers Falls, N.Y., assignor to Texaco Inc., a corporation of Delaware No Drawing. Application October 22, 1957
Serial No. 691,532

6 Claims. (Cl. 23—112)

This invention relates to a process for converting the sodium form of Type A zeolite of effective pore size about 4 A. into the corresponding calcium-sodium Type A zeolite of effective pore size about 5 A., and more particularly to such process whereby a portion of the sodium content originally present in the parent zeolite is exchanged for calcium from an aqueous medium containing a stable, water-soluble calcium salt.

The 5 A. zeolite is useful for separating higher mol weight normal paraffins, olefins, and acetylenic hydrocarbons from non-straight chain hydrocarbons such as isoolefinic, isoparaffinic, naphthenic, and aromatic hydrocarbons. For example, the normal hydrocarbons can be substantially selectively sorbed from the following mixtures: normal butane from isobutane; normal hexane from isoparaffinic hexanes, cyclohexane, and benzene; pentane from isopentane, isooctane, etc. In such processing the zeolite is contacted with the hydrocarbon mixture, preferably in vapor phase, whereby it becomes laden with the straight chain material; the laden zeolite can then be stripped, e.g., at elevated temperature and/or reduced pressure with a light gas such as nitrogen and the sorbed materials recovered.

Properties and structure of the Type A zeolite are described in the articles of Breck et al. and Reed et al. which appear on pages 5963–5977 of the Journal of the American Chemical Society, No. 23, vol. 78, December 8, 1956. The formula (less crystal water) represented for the sodium form of the Type A zeolite in the above-mentioned articles is $Na_{12}(AlO_2)_{12}(SiO_2)_{12}$ which is a multiple of 6 of the empirical mineralogical oxide formula, $Na_2O \cdot Al_2O_3 \cdot 2SiO_2$. For purposes of simplicity I prefer to use the oxide sort of formula for describing the Type A zeolite, but it will be understood that both kinds of formulae are interchangeable for purposes of reference herein to zeolites of the Type A structure.

The hydrated sodium form of Type A zeolite, $Na_2O \cdot Al_2O_3 \cdot 2SiO_2 \cdot 4–5H_2O$, having an effective pore size or diameter about 4 A. can be converted into the calcium-sodium form of Type A zeolite by base exchanging sodium in the structure for calcium, and thereafter dehydrating to be receptive to $C_4+$ hydrocarbons, for example, by calcining in air at a temperature between 220° and 1000° F. Use of a calcining temperature substantially above about 1000° F. can cause collapse of the crystal structure and loss of selective sorbent qualities. Preferably, for efficiency and economy, dehydration at a temperature of 300–600° F. is used.

In the base exchanging operation of calcium for sodium at least about 25% and preferably about 50–80% of the sodium originally present in the parent sodium form of the Type A zeolite should be replaced by calcium to obtain effective pore size approximately 5 A. for selective sorption of $C_4+$ normal hydrocarbons, and the best capacities for such hydrocarbons appear to be in the range of 70 to 85% original sodium displacement.

Advantages of my process over previous similar processes for converting the sodium form of Type A zeolite to the 5 A. calcium-sodium Type A zeolite by ion exchanging a portion of the sodium content for calcium ions include speed and resultant economy.

Broadly my improvement in this exchange process comprises: establishing pH of the aqueous medium at least as high as about 11 by addition of lime thereto, and maintaining the resulting concentration of displaced sodium in the aqueous medium below about 0.9 N by regulating the relative proportions of aqueous medium and zeolite undergoing the ion exchange contact.

If the displaced sodium concentration rises substantially above about 0.9 N (equivalent to roughly a 2% concentration of sodium ion in the aqueous exchange medium) in my exchange operation, the rate of exchange appears to drop off markedly. For exchanging without resorting to extreme dilution, however, I prefer to operate so that the sodium displacement results in a concentration in the aqueous medium between 0.1 N and 0.4 N. Conveniently between about 2 and 30 weight parts of water per part of sodium form of Type A zeolite (approximately fully hydrated) are used to obtain desired resultant low normality of displaced sodium in the aqueous exchange medium.

The high pH created by the lime is that obtained by substantial saturation of the aqueous medium with respect to calcium hydroxide. Of course calcium hydroxide over and above that amount soluble in the aqueous medium at operating temperature can be used. Such excess is not costly, nor, surprisingly, does it appear to affect adversely or contaminate the resulting product. Preferably, for efficiency and economy in the operation, I use slaked lime, that is, a commercial grade of calcium hydroxide, but I can use also a commercial grade of quicklime. Quicklime itself can be advantageous for assisting to warm the exchange solution because it reacts vigorously with the water to give calcium hydroxide, and it establishes a desirable high pH in the exchange medium. High calcium limes (low in magnesium, etc.) are, of course, desirable for highest product purity. In preferred operation I use an aqueous medium containing about 0.2–1.5% dispersed $Ca(OH)_2$, the excess $Ca(OH)_2$ above saturation being suspended by agitation during the base exchanging operation. All the lime can be added initially to the aqueous medium, or it can be added incrementally to maintain the necessary high pH and substantial saturation of the aqueous medium with respect to $Ca(OH)_2$.

Temperature of the operation is preferably between about 70° and about 200° F. for efficiency and economy, but it can be higher or lower, e.g., 40° to 400° F., without substantially affecting the hydrocarbon sorbing capacity or selectivity of the resulting 5 A. calcium-sodium Type A zeolite product (even though the higher temperatures, e.g., 200+° F., appear to give products with X-ray diffraction patterns apparently superior to those made at the lower temperatures). Pressure appears to exert no particular effect on product quality and atmospheric pressure is used for efficiency and economy. Higher and lower pressures are possible, and, to maintain liquid phase conditions at temperatures above the normal boiling point of water, superatmospheric pressures are called for.

Materials of construction for the apparatus can be conventional, e.g., mild steel or stainless steel.

The exchanging operation can be operated batchwise because, in a comparatively short period, e.g., one-half to three hours, sufficient sodium displacement can have been effected in one batch exchanging to give a 5 A. calcium-sodium Type A zeolite with excellent selective hydrocarbon sorbing properties. However, the rapidity of the exchange is such under my process conditions that continuous treatment of the parent sodium form of Type A zeolite can be effected quite well using, for example, a series of countercurrent contacting exchanges with fresh aqueous exchange medium entering one end of the series of contacting steps and fresh parent form of Type A zeolite being fed to the other.

Obviously, the available calcium in the exchange medium must be at least equal stoichiometrically to the amount of sodium to be displaced in the exchange operation. The number of equivalents of available calcium, i.e., from the soluble calcium salt and the calcium hydroxide present in the aqueous medium (suspended or dissolved) will be at least stoichiometrically equal to the number of sodium equivalents to be displaced from the parent sodium form of Type A zeolite; and preferably some excess of total available calcium, e.g., 10 to 100%, will be present in the aqueous medium.

Excellent process conditions can be established by using (1) a water-soluble calcium salt solution having initial normality between about 0.1 and 0.4, and (2) sufficient lime, i.e., slaked lime and/or quicklime, to saturate the solution with respect to calcium hydroxide at exchange temperature. Practically any calcium salt stable in aqueous solution at a suitable operating temperature and capable of forming at least about 0.1 N (and preferably 0.1–0.4 N) aqueous solutions at a suitable operating temperature can be used, the volume of solution beng sufficient to provide at least approximately sufficient soluble calcium to replace the desired amount of sodium from the parent zeolite. However, it is recognized that some deficiency of soluble calcium from the salt can exist, this deficiency being made up by calcium added in the form of lime to the aqueous exchange medium.

Suitable calcium salts for my process can be bromide, chloride, chlorate, chromate, iodide, lactate, nitrate, nitrite, permanganate, salicylate, thisosulfate, thiocarbonate, sulfohydrate, acetate, and formate. I have found, however, that use of a highly ionic salt such as calcium chloride to obtain replacement of above about 90% of the sodium present in the parent zeolite can give rise to formation of undesirable impurities in the resulting mineral sorbent and so adversely affect its selective sorbing characteristics. Advantageously the water-soluble calcium salt used is one having an organic anion which decomposes upon calcination of the resulting calcium-sodium form of Type A zeolite, e.g., acetate or formate. Preferably calcium formate is the stable calcium salt used for the economy and efficiency in the practice of the invention.

The ion exchange contact in the practice of my invention is effected preferably by suspending the solid particles of the sodium form of the Type A zeolite in the aqueous medium with mechanical agitation for one-half hour or longer. If a greater amount of sodium replacement is desired than can be effected rapidly with a single contacting, the resulting calcium-sodium zeolite from a first contacting can be filtered off and treated again with a fresh aqueous exchange medium, and such operation repeated as necessary. The calcium-sodium form of Type A zeolite separated from the mother liquor can be rinsed with water and dried by calcining as previously described herein, the resulting dehydrated mineral sorbent having the empirical formula $(Ca, Na_2)O.Al_2O_3.2SiO_2$ and containing no appreciable water.

For sorption of vapors the fine 5 A. mineral sorbent particles, prior to or after dehydration, are best aggglomerated, e.g., by pelleting or extruding through a die with a suitable binder. Calcination can be used to remove combustible binder from the agglomerated shapes. The fine particles can be agglomerated and stabilized for greater strength, for example, by processes, described in the following copending U.S. patent applications: Riordan et al., Serial No. 554,244, filed on November 1, 1955, assigned to The Texas Company; Hess et al., Serial No. 544,185, filed on November 1, 1955, also assigned to The Texas Company; and Ray, Serial No. 599,231, filed on July 20, 1956, also assigned to The Texas Company.

Suitable parent sodium form of the Type A zeolite can be prepared, for example, by the process shown in the following U.S. patent application: Sensel, Serial No. 617,734, filed on October 23, 1956, also assigned to The Texas Company and now U.S. Patent 2,841,471.

The following examples show ways in which my invention has been practiced but should not be construed as limiting the invention. In all cases the sodium form of Type A zeolite used was air-dried whereby there was slightly less than complete hydration of the zeolite. All percentages are weight percentages unless otherwise stated. The temperature used in all runs was room temperature, i.e., about 70° F., and the pressure used was atmospheric.

*Example 1.*—2000 cc. of 85% formic acid was diluted to 5 gallons with water and to this solution was added 1500 grams of calcium hydroxide. At the end of the lime addition pH of the solution was 11. 10 pounds of the sodium form of Type A zeolite having effective pore size of about 4 Angstrom units was suspended in the solution overnight with agitation. The resulting calcium-sodium Type A zeolite was separated from the solution, and the ion exchange treatment repeated therewith.

After the second treatment, an X-ray diffraction pattern of the base-exchanged zeolite indicated a good grade of calcium-sodium Type A zeolite having effective pore size of about 5 A. Samples of the dehydrated product were tested for capacity to sorb isobutane and normal butane. Test results on the capacity of the product mineral sorbent in terms of cc. of the hydrocarbon gas per gram of zeolite at 75° F. and 760 mm. Hg total pressure was as follows:

| Test No. | Isobutane | n-Butane |
| --- | --- | --- |
| 1 | 3.9 | 45.0 |
| 2 | 2.7 | 45.0 |

*Example 2.*—The following two runs indicate the importance of use of lime to maintain about saturation and resulting high pH in the ion exchange operation.

In the first run a solution of 52 grams of calcium formate in two liters of water was mixed for 2 hours with a pound of the sodium form of Type A zeolite. At the end of this time, the zeolite was separated and resuspended with agitation overnight in a solution containing 104 grams of calcium formate in two liters of water. The so-treated zeolite was again filtered off and resuspended overnight in two liters of water containing 104 grams of calcium formate. After these three extensive ion exchange treatments, the X-ray diffraction pattern of the resulting base-exchanged zeolite indicated inferior hydrocarbon sorbing properties; this was borne out by test of the sorbing capacity of the resulting calcium-sodium zeolite for isobutane and n-butane gas. Test results on the sorbing capacity of this mineral sorbent in terms of cc. of hydrocarbon gas at 75° F. and 760 mm. Hg total pressure is given below:

| Test No. | Isobutane | n-Butane |
| --- | --- | --- |
| 1 | 1.5 | 37.0 |
| 2 | 3.5 | 35.0 |

In a similar treatment a pound of the sodium form of Type A zeolite was agitated for 2 hours with two liters of aqueous medium containing 104 grams of calcium formate and 10 grams of calcium hydroxide. The zeolite was filtered off and resuspended with agitation in the same kind of medium for an additional two hours, then refiltered and resuspended in a third aqueous calcium formate-lime medium of the same composition for another two hours. The X-ray diffraction pattern of the product indicated good selective hydrocarbon sorbing properties. This was borne out by test with isobutane and n-butane gas. Test results on the sorbing capacity of the resulting mineral sorbent in terms of cc. of the hydrocarbon gas per gram of the zeolite at 75° F. and 760 mm. Hg total pressure is given below:

| Test No. | Isobutane | n-Butane |
|---|---|---|
| 1 | 1.4 | 40.0 |
| 2 | 1.6 | 40.0 |

*Example 3.*—In a first run one-half pound of the sodium form of Type A zeolite was suspended with agitation for two hours in a mixture of 80 grams of calcium formate and 10 grams of calcium hydroxide in 5 liters of water. The resulting zeolite was separated and retreated in the same way for a second, a third, and a fourth exchange. The table below shows the progress of approximate sodium replacement by calcium as the operation progressed:

| | Percent Sodium | Percent Calcium | Approximate Percentage of Original Sodium Replaced by Calcium |
|---|---|---|---|
| Initial Zeolite | 13.9 | 0.14 | |
| After First Exchange | 3.9 | 9.5 | 72 |
| After Second Exchange | 2.06 | 13.2 | 84.5 |
| After Third Exchange | 1.5 | 13.9 | 89.2 |
| After Fourth Exchange | 1.5 | 13.9 | 89.2 |

The results of the third and fourth exchanges, above, indicated equilibrium and, importantly, no effect of residual lime.

In a second series of runs one-half pound of the sodium form of Type A zeolite was suspended with agitation for two hours in a mixture of 88 grams of $CaCl_2 \cdot 2H_2O$ and 10 grams of calcium hydroxide in 5 liters of water. The resulting zeolite was filtered off and retreated in the same way for a second, a third, and a fourth exchange. The results were as follows:

| | Percent Sodium | Percent Calcium | Approximate Percentage of Original Sodium Replaced by Calcium |
|---|---|---|---|
| Starting Material | 13.9 | 0.14 | |
| After First Exchange | 3.95 | 9.64 | 71.6 |
| After Second Exchange | 1.65 | 13.3 | 88.1 |
| After Third Exchange | 1.06 | 14.9 | 92.4 |
| After Fourth Exchange | 1.00 | 17.0 | ([1]) |

[1] This product appeared to be seriously contaminated with a compound tentatively identified by the empirical formula $Al_2O_3 \cdot CaCl_2 \cdot 3CaO \cdot 10H_2O$.

I claim:

1. In a process for converting parent sodium form of Type A zeolite of effective pore size about 4 A. into the corresponding calcium-sodium Type A zeolite of effective pore size about 5 A. by exchanging a portion of the sodium content originally present in said parent zeolite for calcium ions from an aqueous medium containing a stable, water-soluble calcium salt, the improvement which comprises: establishing and maintaining pH of said aqueous medium at least as high as about 11 by addition of lime thereto maintaining temperature of said medium at about 40–400° F., and maintaining the resulting concentration of sodium in said aqueous medium below about 0.9 N by regulating the relative proportions of aqueous medium and zeolite undergoing the ion exchange contact.

2. The process of claim 1 wherein the resulting sodium concentration in said aqueous medium is limited to 0.1 N to 0.4 N.

3. The process of claim 1 wherein the lime used is slaked lime.

4. The process of claim 1 wherein the water-soluble calcium salt used is calcium formate at about 0.1–0.4 initial normality in the aqueous medium.

5. The process of claim 1 wherein the water-soluble calcium salt used is calcium chloride at about 0.1–0.4 initial normality in the aqueous medium.

6. The process of claim 1 wherein temperature of the aqueous medium is between 70° and 200° F., about 2 to 30 weight parts of water are used per part of parent zeolite, and the aqueous medium contains about 0.2–1.5% dispersed slaked lime.

References Cited in the file of this patent

UNITED STATES PATENTS 1,756,275    Behrman _____ Apr. 29, 1930